Patented Nov. 3, 1953

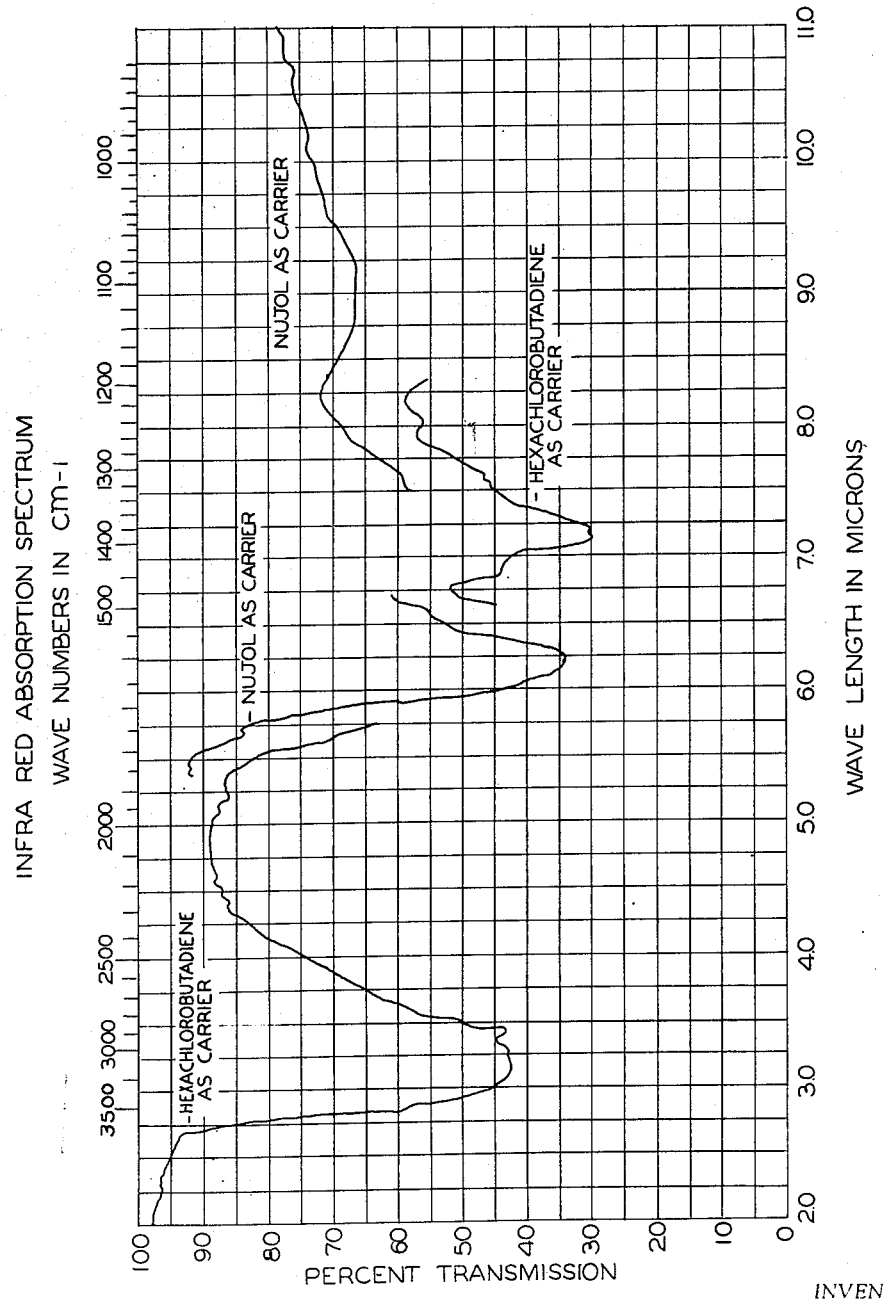

2,658,018

UNITED STATES PATENT OFFICE 2,658,018

SYNNEMATIN AND PROCESS OF PRODUCING THE SAME

Russel Y. Gottshall and John M. Roberts, Lansing, and Lucile M. Portwood, Okemos, Mich., assignors to the State of Michigan Application October 6, 1950, Serial No. 188,862

3 Claims. (Cl. 167—65)

Our invention relates to an antibiotic substance, and particularly to a new and useful antibiotic substance, Synnematin, and the process for preparing or producing same by cultivation under certain conditions from a mold. Antibiotics have previously been produced by molds which are active against certain bacteria, both gram-positive and gram-negative, but within limited classes and which show little or no activity against other groups or classes of bacteria.

In a search for microorganisms capable of producing antibiotic substances, the present invention was discovered and developed. Three molds which inhibit bacterial growth were isolated. In a liquid medium one of these molds (3590A) produced a substance which is more active against certain species of Salmonella than against Escherichia coli and which has a low toxicity for mice.

EXPERIMENTAL PROCEDURES AND RESULTS

The three molds were tested by the cross-streak plate method on penicillin assay agar (Fed. Reg. 1945) and on the same medium to which five per cent normal sheep blood had been added. The molds were grown for six days at the temperatures shown in Table 1, after which the plates were cross-streaked with Micrococcus pyogenes var. aureus (Staphylococcus aureus 209P), Salmonella typhimurium 9, E. coli 621 and Mycobacterium 607 and incubated at 37 C. The zones of inhibition were measured in mm. after 48 hours at this temperature. Table 1 shows the inhibition of gram-positive, gram-negative and acid-fast bacteria by the three molds when grown on agar.

TABLE 1

Comparison of antibacterial properties of the three cultures on cross-streak plates

| Culture | Agar | Incubation temperature (C) | Inhibition in mm. | | | |
|---|---|---|---|---|---|---|
| | | | M. pyogenes | S. typhimurium | E. coli | M. 607 |
| 602 | F. D. A. | 24 | 16 | 6 | 0 | 15 |
| | F. D. A. | 37 | 12 | 13 | 0 | 10 |
| | Blood | 24 | 15 | 6 | 0 | 16 |
| | Blood | 37 | 19 | 16 | tr. | 18 |
| 2653 | F. D. A. | 24 | 13 | 0 | 0 | 15 |
| | F. D. A. | 37 | 15 | tr. | 0 | 14 |
| | Blood | 24 | 10 | 0 | 0 | 12 |
| | Blood | 37 | 13 | tr. | 0 | 13 |
| 3590A | F. D. A. | 24 | 20 | 23 | p10 | 14 |
| | F. D. A. | 37 | 22 | 26 | p11 | 19 |
| | Blood | 24 | 21 | 22 | p10 | 14 |
| | Blood | 37 | 26 | 29 | p13 | 20 | p Partial growth, tr. inhibition for less than 5 mm.

Unless otherwise specified, "broth" or F. D. A. (Food and Drug Administration) refers to the nutrient portion of penicillin assay agar (Fed. Reg. 1945). F. D. A. agar refers to the complete formula. In Table 1 the number 602 represents the number of the culture studied and we are more particularly concerned in this application with the culture number 3590A. It will be noted in this table that abbreviations have been resorted to, the M standing for "Micrococcus" and the S for "Salmonella" and the M in the column at the right hand standing for "Mycobacterium." The organism in culture 3590A was isolated as a laboratory contaminant at the Michigan Department of Health Laboratories. It has been identified as a new species of the genus Cephalosporium and has been designated Cephalosporium salmosynnematum. A culture of 3590A, i. e., the synnematin-producing Cephalosporium of the present invention has been submitted to the United States Department of Agriculture, Agricultural Research Administration, Bureau of Agricultural and Industrial Chemistry, located at Peoria, Illinois. The culture has been deposited in the permanent collection of microorganisms as NRRL 2271 by the Culture Collection Section, Fermentation Division, of the Northern Regional Research Laboratory.

F. D. A. broth culture filtrates of strains 602 and 2653 showed no antibiotic activity while those of strain 3590A inhibited M. pyogenes and S. typhimurium but failed to inhibit Mycobacterium tuberculosis H 37 or M. 607. Traces of the anti-Mycobacterium principle only were obtained in Czapek-Dox solution, and these were not evident when tested in the presence of 10 per cent blood. Because of the relatively high degree of inhibition of S. typhimurium compared with E. coli, the anti-typhimurium factor produced by strain 3590A (NRRL 2271) was investigated. The name "Synnematin," based on the characteristic hyphal fascicles (synnemata), is used to specify this antibiotic.

Method of assay.—One Synnematin unit is defined as the minimum quantity per ml. which completely inhibits the growth of S. typhimurium for 24 hours. Activity is assayed by the broth dilution test with S. typhimurium (Dr. P. R. Edwards, strain 9) as the test organism. Samples for assay are sterilized by Seitz filtration. F. D. A. broth at pH 7.0 is inoculated with one per cent of an 18 to 24 hour culture and two-fold dilutions of the antibiotic are made with 2.0 ml. volumes of the seeded broth.

Production.—Although the streak plate results indicated better Synnematin formation at a temperature higher than 24 C., the same result was not observed consistently in broth incubated at 30 or 37 C. When grown in shallow layer cultures at 24 C., strain 3590A (NRRL 2271) produced 16 units of Synnematin per ml. in the media described by Schatz, Bugie and Waksman (1944), and by Le Page and Campbell (1946) and in F. D. A. broth. This potency was the highest obtained with the common types of production media. Corn steep liquor did not support the growth of 3590A (NRRL 2271). Shaken or aerated cultures have not resulted in higher potencies than stationary cultures. Because of its short production time, five to nine days, F. D. A. broth was used for preparing the initial lots for extraction. Later it was found that Synnematin was produced on a simplified medium composed of bacto casamino acids, 10.0 g.; glucose, 1.0 g.; $MgSO_4 \cdot 7H_2O$, 0.25 g. and $FeSO_4 \cdot 7H_2O$, 0.01 g. per liter of tap water, pH 6.7–6.9. Three hundred ml. of broth is dispensed in two-quart milk bottles and autoclaved at 121 C. Each bottle is seeded with six ml. of a four-day old culture in Czapek-Dox medium and incubated on the flat side at 24 C. Peak activity, 8 to 32 units, is obtained in six to nine days. At this time the pH is 7.9 to 8.3.

*Stability.*—The activity in culture filtrates disappears at pH 2 after three hours at room temperature but remains unchanged at pH 5, 7.5 or 9 for twenty-four hours. Solutions of Synnematin are stable at pH 2 for 45 minutes if held at 5 C. Heating at 117 C. for 10 minutes reduces the activity at pH 5 or 7.5 and destroys it at pH 3 or 9. Partially purified dried Synnematin showed no change in antibiotic activity after 11 months at 5 C. but showed a decrease in potency after 17 months at this temperature.

*Chemical behaviour.*—Synnematin is not extracted from culture filtrates by amyl acetate, n-butanol, chloroform, or diethyl ether at pH 2, 4, 6, or 8. Partially purified dried Synnematin is readily soluble in water, methanol, 75 per cent acetone or 50 per cent ethanol and insoluble in absolute ethanol, acetone or diethyl ether. Addition of diethyl ether or acetone to a methanol solution resulted in precipitation of the antibiotic but little purification was effected and the yields were low. The antibiotic is absorbed by charcoal but the concentration of charcoal and the pH required for absorption varies with different culture media. All the antibiotic is removed from casamino acid media at pH 6 by a concentration of charcoal equal to that of the casamino acid content. For complete adsorption from F. D. A. broth, two per cent charcoal and a pH of 3 are required. Methanol, 75 per cent acetone or alkaline butanol-saturated water are effective eluents. Concentrations of acetone higher than 75 per cent fail to elute synnematin. Low concentrations of acetone or butanol-saturated water carry extra impurities into the eluate. Synnematin dialyzes through cellophane (Du Pont 300). The antibiotic is not destroyed by trypsin at pH 7.8 at 37 C. for 24 hours.

*Purification.*—For clarification and partial decolorization, the casamino acid culture liquid is adjusted to pH 6 with $H_3PO_4$, mixed with 0.25 per cent charcoal e. g. nuchar C-190-N, and filtered with the aid of 0.5 per cent standard diatomaceous silica e. g. supercel. The antibiotic is then absorbed from the resulting filtrate on one per cent activated charcoal e. g. darco G-60. The wet activated charcoal is stirred into one-eighth the original volume of 90 per cent acetone and filtered. The eluate contains 70 to 80 per cent acetone. A second elution with 75 per cent acetone removes additional antibiotic. The eluates are pooled and passed through a 40 by 80 mm. column of adsorbent clay e. g. florisil which separates the active fraction in an orange-colored band at the top of the column. Synnematin, eluted from the column with water, is shell-frozen and dried. In an alternative procedure, the eluate from charcoal is concentrated in vacuum at a temperature under 30 C. and the residue is clarified with two per cent charcoal at pH 7. The charcoal filtrate is shell-frozen and dried. The latter procedure was used for purification of material for biological tests and for obtaining the infra-red adsorption spectrum shown in the drawing. This synnematin preparation as shown in the drawing exhibits characteristic absorption bands in the infra-red region of the spectrum when suspended (a) in heavy paraffin oil, e. g., Nujol, at the following frequencies expressed in reciprocal centimeters: 1600 and 1140–1080, and (b) in hexachlorobutadiene at the following frequencies expressed in reciprocal centimeters: 3330–2900 and 1400–1380. The strongest bands in the specified mediums are at 3330–2900, 1600 and 1400–1380, while the band at 1140–1080 is a relatively weak broad band. About 35 per cent of the original activity was recovered. Crystalline Synnematin has not been isolated; the most pure material thus far obtained contains 32 units per mg.

*Activity of Synnematin against bacteria and molds.*—The anti-microbial spectrum of Synnematin against various bacteria and molds is given in Table 2. All of the tests were read in 24 hours except *Corynebacterium diphtheriae* which was read after three days incubation, *M. tuberculosis*, 42 days; *M. phlei*, seven days; and the molds, eight to fourteen days. The inoculum was one per cent of a 24 hours' culture of the organisms in all the tests except for *C. diphtheriae* in which a loopful of pellicle from a three-day culture was floated on the surface of the tubes of serially diluted Synnematin and for *H. pertussis*, *M. tuberculosis*, *M. phlei* and the molds which were inoculated by streaking the surface of the agar slants containing dilutions of Synnematin.

TABLE 2

*Activity of Synnematin against bacteria and molds*

| Organism | Test medium | Units/ml. required for inhibition |
|---|---|---|
| Aerobacter aerogenes | FDA broth | 64 |
| Do | do | 64 |
| Do | do | 64 |
| Do | do | 64 |
| Do | do | 64 |
| Bacillus subtilis | do | 8 |
| Brucella abortus | Tryptose broth | 2 |
| Brucella melitensis | do | 1 |
| Brucella suis | do | 1 |
| Clostridium perfringens | Mueller's seed medium | 16 |
| Corynebacterium diphtheriae | Veal infusion broth | 0.25 |
| Diplococcus pneumoniae Type III | Felton's medium | 1 |
| Escherichia coli | FDA broth | 64 |
| Escherichia coli var. communior | do | 32 |
| Do | do | 32 |
| Escherichia coli var. communis | do | 64 |
| Hemophillus pertussis | B-G medium | 16 |
| Klebsiella pneumoniae | FDA broth | 32 |
| Micrococcus pyogenes var. aureus | do | 1 |
| Do | do | 2 |
| Do | do | 2 |
| Mycobacterium tuberculosis var. hominis | Glycerol beef extract agar | 12 |
| Mycobacterium phlei | do | 12 |
| Proteus sp | FDA broth | 1 |
| Proteus morganii | do | 64 |
| Pseudomonas aeruginosa | do | 32 |
| Salmonella choleraesuis | do | 1 |
| Salmonella enteritidis | do | 1 |
| Salmonella paratyphi | do | 1 |
| Salmonella pullorum | do | 0.5 |
| Salmonella schottmulleri | do | 1 |

TABLE 2

*Activity of Synnematin against bacteria and molds—Con.*

| Organism | Test medium | Units/ml. required for inhibition |
|---|---|---|
| *Salmonella typhimurium* | FDA broth | 1 |
| Do | do | 1 |
| Do | do | 2 |
| Do | do | 2 |
| *Salmonella typhosa* | do | 0.5 |
| Do | do | 0.5 |
| *Shigella alkalescens* | do | 16 |
| Do | do | 4 |
| Do | do | 8 |
| *Shigella dysenteriae Flexner* X | do | 32 |
| *Shigella Larington* | do | 1 |
| *Shigella madampensis Dispar* I | do | 64 |
| *Shigella paradysenteriae* | do | 64 |
| Do | do | 64 |
| Do | do | 64 |
| Do | do | 64 |
| Do | do | 64 |
| Do | do | 64 |
| Do | do | 64 |
| Do | do | 4 |
| Do | do | 32 |
| Do | do | 8 |
| Do | do | 64 |
| *Shigella rabaulensis* | do | 16 |
| *Shigella schmitzii* | do | 4 |
| *Shigella shiga Shiga* I | do | 32 |
| *Shigella sonnei* | do | 64 |
| *Streptococcus hemolyticus* | Felton's | 1 |
| Do | do | 32 |
| Do | do | 4 |
| Do | do | 32 |
| Do | do | 2 |
| Do | do | 2 |
| Do | do | 1 |
| Do | do | 4 |
| *Aspergillus flavus* | FDA agar | >12 |
| *Aspergillus niger* | do | >12 |
| *Histoplasma capsulatum* | do | >12 |
| *Mucor* sp | do | >12 |
| *Penicillium notatum* | do | >12 |
| *Streptomyces griseus* | do | >12 |
| *Trichophyton mentagrophytes* var. *gypseum* | do | 12 |

*Effect of blood serum upon activity.*—Synnematin is approximately one-half as active in the presence of horse serum as it is in plain broth. The growth of *S. typhimurium* was completely inhibited by one unit in broth, but two units were required for inhibition in broth to which 20 per cent horse serum was added. In comparative tests, *M. pyogenes* was inhibited by two units in plain broth and by four units in the presence of horse serum.

*Relation of the size of the inoculum to activity.*—The size of inoculum has little effect on the concentrations necessary to prevent growth. Serial two-fold dilutions of Synnematin were prepared in broth and to each tube was added an equal quantity of inoculated broth. The number of organisms in the inoculated broth was varied as shown in Table 3. The tests were incubated at 37° C. and read after 24 hours' incubation.

TABLE 3

*Effect of the size of inoculum on the activity of Synnematin*

| Test organism | | | |
|---|---|---|---|
| *S. typhimurium* | | *M. pyogenes* | |
| No. of organisms per ml. | No. of units per ml. for inhibition | No. of organisms per ml. | No. of units per ml. for inhibition |
| 70 | 0.5 | 36 | 2.0 |
| 7,000 | 1.0 | 3,600 | 2.0 |
| 700,000 | 1.0 | 360,000 | 4.0 |
| 70,000,000 | 1.0 | 36,000,000 | 4.0 |

*Bactericidal activity of Synnematin.*—Table 4 shows that Synnematin reduces the number of organisms but even 16 to 32 units does not sterilize the cultures. A series of tubes containing two-fold dilutions of Synnematin in broth were inoculated with an equal quantity of broth seeded with one per cent of an 18 to 24 hours' culture of *M. pyogenes*. Another series of tubes was similarly inoculated with *S. typhimurium*.

The number of organisms present before and after 24 hours' incubation at 37° C. was determined by plating on nutrient agar. In the test made with *M. pyogenes* there were more organisms present in the tube containing 16 or 32 units than in the tube containing only one unit of Synnematin. Identical results were obtained in several other experiments conducted in a similar manner. It is possible that this phenomenon is the same as the one described for penicillin by Eagle (1948).

TABLE 4

*Reduction of the number of organisms in the presence of Synnematin*

| Exp. No. | Test organism | | | | | |
|---|---|---|---|---|---|---|
| | *M. pyogenes* | | | *S. typhimurium* | | |
| | Concentration of antibiotic, units | No. of organisms before incubation | No. of organisms after incubation | Concentration of antibiotic, units | No. of organisms before incubation | No. of organisms after incubation |
| 1 | 1 | 5,400,000 | 90 | 1 | 13,000,000 | 80 |
| | 32 | 5,400,000 | 260,000 | 32 | 13,000,000 | 270 |
| 2 | 1 | 5,000,000 | 300 | 1 | 9,200,000 | 36 |
| | 16 | 5,000,000 | 100,000 | 32 | 9,200,000 | 20 |

*Effect of pH of the medium on the activity of Synnematin.*—The data in Table 5 show that the antibiotic is more active in a slightly acid medium than in an alkaline one.

TABLE 5

*The effect of pH on the activity of Synnematin*

| pH of broth | Units per ml. for inhibition | |
|---|---|---|
| | *S. typhimurium* | *M. pyogenes* |
| 5.8 | 1 | 2 |
| 7.0 | 1 | 4 |
| 7.9 | 2 | 8 |

*Neutralization by cysteine.*—Serial two-fold dilutions of Synnematin containing from 256 to 1 unit per ml. were made with 2.0 ml. volumes of broth seeded with *S. typhimurium* or *M. pyogenes*. To each tube was added 2.0 ml. of a solution of cysteine (2 g. cysteine in 100 ml. of broth, adjusted to pH 7.0 and sterilized by filtration). After incubation, the presence of growth in all tubes showed that 10 mg. of cysteine neutralizes at least 256 units of Synnematin. Higher concentrations of Synnematin were not tested.

*Induced resistance developed toward Synnematin.*—Serial two-fold dilutions of Synnematin containing 128 units per ml. were made in broth seeded with *M. pyogenes* or *S. typhimurium* or, in Felton's broth seeded with *D. pneumoniae*. Twenty-four hours later a similar series of tubes was made in which the one per cent inoculum was taken from the tube containing the highest concentration of antibiotic permitting growth. These daily transfers were repeated 12 times. The results given in Table 6 show that the resistance of *S. typhimurium* toward Synnematin increased 32 fold but in the case of *M. pyogenes* and D. pneumoniae the resistance increased only eight fold.

TABLE 6

*Resistance to Synnematin induced in three organisms by daily transfer in broth containing the antibiotic*

| Transfer No. | Units os Synnematin required for complete inhibition | | |
|---|---|---|---|
| | S. typhimurium | M. pyogenes | D. pneumoniae Type III |
| 1 | 1 | 4 | 1 |
| 2 | 4 | 4 | 2 |
| 3 | 8 | 8 | 2 |
| 4 | 8 | 8 | 2 |
| 5 | 8 | 8 | 4 |
| 6 | 8 | 8 | 4 |
| 7 | 16 | 16 | 4 |
| 8 | 16 | 16 | 4 |
| 9 | 16 | 16 | 8 |
| 10 | 32 | 16 | 8 |
| 11 | 32 | 32 | 8 |
| 12 | 32 | 32 | 8 |

*In vivo activity.*—Preliminary experiments were made to determine whether Synnematin protected mice after injection with D. pneumoniae type III and chick embryos after injection with S. pullorum.

Table 7 shows the effect of the treatment of mice with Synnematin after intraabdominal injection of 0.1 ml. of various dilutions of a 24 hour culture of D. pneumoniae type III. The Synnematin was made up in ten percent solution and 0.5 ml. injected subcutaneously, the single dose, or the first dose when two doses were given, was administered immediately after the injection of the organisms. The animals were observed for 14 days.

TABLE 7

*Effect of Synnematin on mice infected with D. pneumoniae type III*

| Dilution of culture | No. of mice | Dose of Synnematin | Percent survived |
|---|---|---|---|
| 10⁻⁷ | 6 | None, control | 67 |
| 10⁻⁶ | 6 | do | 17 |
| 10⁻⁶ | 6 | 800 units in 1 dose | 100 |
| 10⁻⁴ | 6 | do | 100 |
| 10⁻² | 6 | do | 50 |
| 10⁻⁶ | 6 | 1600 units in 2 doses 8 hours apart | 100 |
| 10⁻⁴ | 6 | do | 100 |
| 10⁻² | 6 | do | 100 |

Table 8 shows the effect of the treatment of chick embryos after infection with 0.1 ml. of various dilutions of a 24 hour culture of S. pullorum. Eleven day old chick embryos were used and all injections were made into the allantoic cavity. One-tenth ml. of a 20 per cent solution of Synnematin was given immediately after the injection of organisms. After further incubation for eight days the eggs were cultured on both nutrient and tetrathionate broth. Cultures were plated on SS agar and on bismuth sulphite agar.

*Effect of Synnematin on chick embryos infected with S. pullorum*

| Dilution of culture | No. of embryos | Dose of Synnematin | Percent of uninfected embryos |
|---|---|---|---|
| 10⁻⁹ | 6 | None, control | 17 |
| 10⁻⁸ | 6 | do | 83 |
| 10⁻⁷ | 6 | do | 100 |
| 10⁻⁸ | 6 | 320 units in 2 doses 24 hours apart | 100 |
| 10⁻⁷ | 6 | do | 100 |
| 10⁻⁶ | 6 | do | 100 |
| 10⁻⁵ | 6 | do | 100 |

As shown in Table 8 above the antibiotic composition, Synnematin, is effective against S. pullorum. In the veterinary field the antibiotic composition is also effective for controlling S. pullorum infections in chickens.

*Toxicity.*—When administered intraperitoneally, 20 g. mice tolerated 100 mg. of partially purified Synnematin. Four hundred mg. was not lethal when 100 mg. of the material was injected in two equally divided doses daily over a period of four days. One hundred mg. contained 3200 Synnematin units. Injection of larger doses awaits further purification of the antibiotic.

All the tests were made with partially purified Synnematin and further purification may establish the presence of more than one chemical entity. The material investigated has certain attributes of a clinically desirable antibiotic such as: (1) It is soluble in water and in physiological saline. (2) It is stable and active near neutrality. (3) It is active against a large number of species of bacteria. (4) The size of inoculum has little effect on the concentration necessary to prevent growth. (5) Organisms do not appear to develop resistance rapidly. (6) It has a low toxicity for mice.

SUMMARY

Three molds were isolated and found to inhibit bacterial growth. A water soluble antibiotic, Synnematin, was produced in broth cultures of one of the molds 3590A (NRRL 2271), and partially purified.

Crude preparations inhibit in vitro certain species of Brucella, Corynebacterium, Micrococcus, Streptococcus, all species of Salmonella tested and some species of Shigella. Synnematin is inactive against the strains of Aerobacter, Escherichia, Mycobacterium, filamentous molds which were tested and most species of Shigella. Its low toxicity and other properties are reported.

The formulae of the broths set out may be varied. We have discovered that certain nitrogenous substances are usable singly or along with other combinations.

These nitrogenous substances are the following:

Tryptone
Beef extract
Yeast extract
An alcohol-insoluble fraction of yeast extract
Trypticase (tryptic digest of casein)
Casein (not hydrolyzed)
Casamino acids (acid digest of casein)
Peptone
Corn gluten hydrolysate
Glutamino acids (acid digest of gluten)
An acid digest of soy bean meal
Edestine
Glutamine
Aoparagine
Arginine Carbohydrates which are usable with one or more of the above named nitrogenous substances or combinations are:

Glucose
Lactose
Sucrose
Maltose
Glycerine
Sugar beet molasses

Minerals whose salts have been incorporated in various media to advantage are:

Iron (both ferric and ferrous) (as sulfate, citrate, chloride, ammonium citrate)
Magnesium (as sulfate)
Manganese (as sulfate)
Phosphorous (as phosphate)

A basic Synnematin production medium is as follows:

| | Percent |
|---|---|
| Casamino acids | 1.0 |
| Lactose | 0.1 |
| Ferrous sulfate | 0.0005 |
| Magnesium sulfate | 0.025 |

In tap water

Various dilutions of this basic formula or medium may be made with satisfactory Synnematin-producing results. Among the formulae which we have used for medium for production of Synnematin is Goth's formula set out in the Journal of Laboratory and Clinical Medicine, 1945, in an article by Andre Goth, volume 30, page 899. This formula consists of:

| | Percent |
|---|---|
| Bacto-tryptone | 2 |
| Glucose | 2 |
| Sodium chloride | 0.5 |

In distilled water

A modification of the medium commonly referred to as "A, C, and L" and described in an article by Arnstein, Cook and Lacey, 1946, British Journal Experimental Pathology, volume 27, page 349, may be used. This medium consists of the following:

| | Percent |
|---|---|
| Sodium nitrate | 0.30 |
| Di-Potassium phosphate | 0.10 |
| Magnesium sulfate | 0.05 |
| Potassium chloride | 0.05 |
| Ferrous sulfate | 0.001 |
| Glucose | 4.00 |
| Tryptone | 0.50 |

In distilled water

A broth developed by Le Page & Campbell and described in the 1946 Journal of Biological Chemistry, volume 162, pages 163–171 may be used, this formula being as follows:

| | Percent |
|---|---|
| Glucose | 1.0 |
| Yeast extract | 1.0 |
| Sodium chloride | 0.5 |
| Ferrous sulfate | 0.001 |
| Magnesium sulfate | 0.025 |

In distilled water.

The formula known as Waks, developed by Schatz, Bugie and Waksman and described in the 1944 Procedure of the Society of Experimental Biology and Medicine, volume 55, pages 66–69, may be used. This formula consists of:

| | Percent |
|---|---|
| Peptone | 0.5 |
| Meat extract | 0.5 |
| Glucose | 1.0 |
| Sodium chloride | 0.5 |

In distilled water

A Food and Drugs Administration formula known as Federal Register 1945 and described in 10 F.R. pages 11478–11485 may be used. This medium being as follows:

| | Percent |
|---|---|
| Peptone | 0.60 |
| Tryptic digest of casein | 0.40 |
| Yeast extract | 0.30 |
| Beef extract | 0.15 |
| Glucose | 0.10 |
| Sodium chloride | 0.50 |

In distilled water

It is believed that various types of broth may be used and the formulae have been as examples. In setting out these various formulae we have not been unmindful of the fact that some of the ingredients may be substituted for others as they are well known equivalents of each other and it is of course intended that the equivalents shall be embraced herein.

Particular characteristics and attributes, both of the product and the process are detailed in the claims which follow.

What we claim is:

1. A process for the production of Synnematin comprising cultivating a culture medium inoculated with the organism *Cephalosporium salmosynnematum* (NRRL 2271) for several days, adjusting the resulting Synnematin-containing broth to pH 6, and recovering Synnematin therefrom.

2. A process for the production of Synnematin comprising cultivating a bacto casamino acid culture medium containing glucose and sulfate salts of magnesium and iron and inoculated with the organism *Cephalosporium salmosynnematum* (NRRL 2271) at about 24 to 37° C. for several days, adjusting the resulting Synnematin-containing broth to pH 6, absorbing the Synnematin on activated charcoal and recovering the absorbed Synnematin by eluting with aqueous acetone containing about 75% acetone.

3. The composition resulting from the growth of *Cephalosporium salmosynnematum* (NRRL 2271) in a culture medium, said composition being characterized by its ability to inhibit the growth of *Brucella abortus*, *Brucella melitensis*, *Brucella suis*, *Corynebacterium diphtheriae*, *Diplococcus pneumoniae* type III, *Micrococcus pyrogenes* var. *aureous*, *Salmonella enteritidis*, *Salmonella paratyphi*, *Salmonella pullorum*, *Salmonella schottmuller*, *Salmonella typhimurium*, and *Samonella typhosa*, the active ingredients in said composition being soluble in water, methanol, 75% acetone and 50% ethanol and insoluble in acetone and diethyl ether; said composition being further characterized by being unstable in culture filtrates at pH 2 at room temperature and being relatively stable for 24 hours at pH values of 5, 7.5 and 9 at room temperature, said composition exhibiting characteristic absorption bands in the infra-red region of the spectrum (a) when suspended in heavy paraffin oil at the following frequencies expressed in reciprocal centimeters: 1600 and 1140–1080; and (b) when suspended in hexachlorobutadiene at the following frequencies expressed in reciprocal centimeters: 3330–2900 and 1400–1380.

RUSSEL Y. GOTTSHALL.
JOHN M. ROBERTS.
LUCILE M. PORTWOOD.

References Cited in the file of this patent

UNITED STATES PATENTS

| Number | Name | Date |
|---|---|---|
| 2,442,141 | Moyer | May 25, 1948 |
| 2,482,055 | Duggar | Sept. 13, 1949 |

OTHER REFERENCES

Waksman and Horning, Mycologia, volume 35, 1943, article, pages 47 to 65, pages 55, 59.

Lacey, in "Journal of Gen. Microbiol.," May 1950, page 122.

Cook et al., in "Nature," volume 160, July 5, 1947, page 131.

"Microbial Antagonism and Antibiotic Substances," by Waksman, published 1947 by the Commonwealth Fund, New York city, page 131.

"Antibiotics," volume I, by Florey et al., Oxford Med., published 1949 by Oxford U. Press, England, pages 244, 329 to 332.